(12) United States Patent
Im et al.

(10) Patent No.: US 12,325,091 B2
(45) Date of Patent: Jun. 10, 2025

(54) STAINLESS STEEL WELDING WIRE FOR USE IN LNG TANK MANUFACTURING

(71) Applicant: ESAB SEAH CORP., Gyeongsangnam-do (KR)

(72) Inventors: Hee Dae Im, Gyeongsangnam-do (KR); Woong Kil, Gyeongsangnam-do (KR); Chang Hyun Choi, Gyeongsangnam-do (KR); Jae Heon Jung, Gyeongsangnam-do (KR)

(73) Assignee: ESAB SEAH CORP., Gyeongsangnam-Do (KR)

( * ) Notice: Subject to any disclaimer, the term of this patent is extended or adjusted under 35 U.S.C. 154(b) by 154 days.

(21) Appl. No.: 17/752,932

(22) Filed: May 25, 2022

(65) Prior Publication Data

US 2022/0281038 A1   Sep. 8, 2022

Related U.S. Application Data

(63) Continuation of application No. PCT/KR2020/016751, filed on Nov. 25, 2020.

(30) Foreign Application Priority Data

Nov. 26, 2019  (KR) ................ 10-2019-0153514
Sep. 21, 2020  (KR) ................ 10-2020-0121504

(51) Int. Cl.
| B23K 9/00 | (2006.01) |
| B23K 9/16 | (2006.01) |
| B23K 35/00 | (2006.01) |
| B23K 35/02 | (2006.01) |
| B23K 35/30 | (2006.01) |
| B23K 101/12 | (2006.01) |

(52) U.S. Cl.
CPC ............ *B23K 35/0266* (2013.01); *B23K 9/16* (2013.01); *B23K 35/308* (2013.01); *B23K 2101/12* (2018.08)

(58) Field of Classification Search
CPC .. B23K 35/0266; B23K 9/16; B23K 2101/12; B23K 35/0261; B23K 35/308; C22C 38/02; C22C 38/44; C22C 38/48; C22C 38/58

See application file for complete search history.

(56) References Cited

U.S. PATENT DOCUMENTS

| 3,201,233 A * | 8/1965 | Hull ............ C22C 38/001 |
| | | 420/47 |
| 3,740,525 A * | 6/1973 | Baumel ........... B23K 35/3053 |
| | | 219/137 WM |
| 4,017,711 A * | 4/1977 | Honma ........... B23K 35/3608 |
| | | 420/583 |
| 4,816,085 A * | 3/1989 | Flasche ........... B23K 35/3086 |
| | | 420/49 |
| 6,042,782 A * | 3/2000 | Murata ............ B23K 35/3086 |
| | | 428/677 |
| 2008/0093352 A1 | 4/2008 | Jang et al. |
| 2012/0055903 A1 | 3/2012 | Izutani |
| 2015/0076130 A1 * | 3/2015 | Zhang .............. B23K 9/173 |
| | | 219/137 R |
| 2018/0221997 A1 | 8/2018 | Starck |
| 2020/0230733 A1 | 7/2020 | Mukai |
| 2021/0086314 A1 | 3/2021 | Sorrentino |
| 2022/0193833 A1 | 6/2022 | Mukai |

FOREIGN PATENT DOCUMENTS

| CA | 2992679 A1 * | 8/2018 | ........ B23K 35/0261 |
| CN | 103521946 A * | 1/2014 | ........... B23K 35/308 |
| CN | 103537820 A * | 1/2014 | ........... B23K 35/308 |
| CN | 103648708 A * | 3/2014 | ........ B23K 35/3053 |
| CN | 103962745 A * | 8/2014 | ........ B23K 35/3086 |
| CN | 104175017 A * | 12/2014 | ........ B23K 35/0261 |
| CN | 104227265 A * | 12/2014 | ........ B23K 35/0261 |
| CN | 104493374 A * | 4/2015 | ........ B23K 35/3053 |
| CN | 104759784 A * | 7/2015 | ........ B23K 35/3053 |
| CN | 103753051 B * | 8/2015 | ........... B23K 35/304 |
| CN | 104907729 A * | 9/2015 | |
| CN | 104907730 A * | 9/2015 | |
| CN | 105269175 A * | 1/2016 | ........... B23K 35/304 |
| CN | 103962745 B * | 8/2016 | ........ B23K 35/3086 |
| CN | 106312242 A * | 1/2017 | ........... B23K 33/004 |
| CN | 106392376 A * | 2/2017 | |
| CN | 106563888 A * | 4/2017 | |
| CN | 106563889 A * | 4/2017 | |
| CN | 106563892 A * | 4/2017 | |

(Continued)

OTHER PUBLICATIONS

Machine translation of KR-20160093821-A (no date available).*
Machine translation of JP 52-134440 (no date available).*
International Search Report for International Application No. PCT/KR2020/016749 dated Feb. 3, 2021, 4 pages.
International Search Report for International Application No. PCT/KR2020/016750 dated Feb. 24, 2021, 4 pages.
Extended European Search Report for European Application No. 20892161.9 dated Jul. 12, 2023, 6 pages.
Notice of Reason for Rejection for Japanese Application No. 2022-531395 mailed Aug. 1, 2023 with English translation, 18 pages.

(Continued)

*Primary Examiner* — Kiley S Stoner
(74) *Attorney, Agent, or Firm* — Edell, Shapiro & Finnan, LLC

(57) ABSTRACT

A stainless-steel welding wire for use in manufacture of an LNG tank is described. From the welding wire, it is possible to obtain a weld metal having excellent tensile strength and impact value because the contents of Ni, Mn, Mo, and Cr in the welding wire are adjusted. The welding wire can be applied to welding of all of 9% nickel steel, high manganese steel, and stainless-steel materials by adjusting the content relationship of Ni, Mn, Mo, and Cr, and has the effect of obtaining a weld metal with excellent ultra-low temperature toughness in the weld zone.

8 Claims, No Drawings

(56) References Cited

FOREIGN PATENT DOCUMENTS

| | | | | |
|---|---|---|---|---|
| CN | 106736029 A | * | 5/2017 | ......... B23K 35/3086 |
| CN | 106736032 A | | 5/2017 | |
| CN | 106862797 A | * | 6/2017 | ........... B23K 31/027 |
| CN | 107262960 A | * | 10/2017 | |
| CN | 107398656 A | * | 11/2017 | ......... B23K 35/0255 |
| CN | 107971657 A | | 5/2018 | |
| CN | 108971798 A | * | 12/2018 | ........... B23K 35/308 |
| CN | 109207697 A | * | 1/2019 | |
| CN | 109454358 A | * | 3/2019 | ......... B23K 35/0261 |
| CN | 110369910 A | * | 10/2019 | |
| CN | 106736029 B | * | 11/2019 | ......... B23K 35/3086 |
| CN | 106944763 B | * | 1/2020 | |
| CN | 110640349 A | | 1/2020 | |
| CN | 110919235 A | * | 3/2020 | ......... B23K 35/0261 |
| CN | 111069747 A | * | 4/2020 | |
| CN | 107214436 B | * | 5/2020 | ......... B23K 35/3086 |
| CN | 111112876 A | | 5/2020 | |
| CN | 111168275 A | * | 5/2020 | ......... B23K 35/3086 |
| CN | 111761174 A | * | 10/2020 | ........... B23K 33/004 |
| DE | 19908034 A1 | * | 9/2000 | ......... B23K 35/3086 |
| EP | 0867256 A1 | * | 9/1998 | |
| EP | 3360641 A1 | | 8/2018 | |
| JP | 52013441 A | * | 2/1977 | |
| JP | H08267282 A | | 10/1996 | |
| JP | 11197883 A | | 7/1999 | |
| JP | 2000117488 A | | 4/2000 | |
| JP | 2000343274 A | * | 12/2000 | |
| JP | 2000343277 A | | 12/2000 | |
| JP | 2002-001504 A | | 1/2002 | |
| JP | 2007160314 A | | 6/2007 | |
| JP | 2007203350 A | | 8/2007 | |
| JP | 2007-229781 A | | 9/2007 | |
| JP | 2010500178 A | | 6/2010 | |
| JP | 2018089678 A | | 6/2018 | |
| JP | 2019093428 A | | 6/2019 | |
| KR | 20020010061 A | * | 2/2002 | |
| KR | 100925321 B1 | | 11/2009 | |
| KR | 1020150074937 B1 | | 7/2015 | |
| KR | 2016093821 A | * | 8/2016 | ......... B23K 35/0261 |
| KR | 20160093821 A | * | 8/2016 | |
| KR | 1020160093821 A | | 8/2016 | |
| KR | 20170088762 A | | 8/2017 | |
| KR | 1020180076088 A | | 7/2018 | |
| KR | 1020180108730 B1 | | 10/2018 | |
| KR | 20190017413 A | | 2/2019 | |
| KR | 1020190087846 A | | 7/2019 | |
| KR | 20190124585 A | * | 11/2019 | |
| WO | WO-2009145347 A1 | * | 12/2009 | ......... B23K 35/3053 |
| WO | WO-2016010782 A1 | * | 1/2016 | ........... B23K 35/308 |
| WO | WO-2017001575 A1 | * | 1/2017 | ............. B23K 31/02 |
| WO | 2019102932 A1 | | 5/2019 | |

OTHER PUBLICATIONS

First Office Action for Chinese Patent Application No. 202080082962.X dated Sep. 9, 2023 with machine translation, 13 pages.
Notice of Reason for Rejection for Japanese Application No. 2022-532014 mailed Aug. 22, 2023 with English translation, 11 pages.
Notice of Reason for Rejection for Japanese Application No. 2022-531529 mailed Aug. 22, 2023 with English translation, 12 pages.
International Search Report for International Application No. PCT/KR2020/016751 dated Feb. 24, 2021, 4 pages.
Office Action for Japanese Patent Application No. 2022-531529 mailed Apr. 23, 2024 with machine translation, 6 pages.
Official Action (a Notice of Reason for Rejection) for Chinese Patent Application No. 202080082391.X mailed Apr. 27, 2024 with machine translation, 10 pages.
Supplementary Partial European Search Report in counterpart European Application No. 20893110.5, mailed Apr. 25, 2025, 16 pages.

* cited by examiner

STAINLESS STEEL WELDING WIRE FOR USE IN LNG TANK MANUFACTURING

TECHNICAL FIELD

The present invention relates to a stainless-steel welding wire used to manufacture an LNG tank and, more particularly, relates to a stainless-steel welding wire used to manufacture an LNG tank, the wire being configured such that the contents of Ni, Mn, Cr, and Mo are adjusted as desired so that it is possible to obtain a weld metal having excellent strength and cryogenic impact toughness from the welding wire.

BACKGROUND

Liquid gases such as liquefied natural gas (LNG) having a boiling point of −164° C.), liquefied oxygen having a boiling point of −183° C., liquid nitrogen having a boiling point of −196° C., etc. require cryogenic storage. Therefore, to store these gases, a structure such as a pressure vessel made of a material having sufficient toughness and strength at cryogenic temperatures is required.

As a material usable at a low temperature in a liquefied gas atmosphere, a Cr—Ni-based stainless alloy, 9% Ni steel, and 5000-series aluminum alloy have been commonly used. However, in the case of using aluminum alloy, there are problems in that the alloy cost is high, the design thickness of the structure is large due to low strength, and the use is limited due to poor weldability. Cr—Ni-based stainless steel and 9% Ni steel overcome the problem of low strength of aluminum but have been problematic in application due to increase in manufacturing cost because expensive nickel needs to be included.

In addition, as another technique for structural steel used in liquefied gases, so-called nickel-free (Ni-free) high-manganese steel that is completely free of nickel has been used. However, these techniques have problems in that cost increases and load to heat treatment facility increases due to an increase in the number of heat treatment cycles. Accordingly, as disclosed in Korean Patent No. 10-135843, a technology for securing cryogenic toughness by using austenite as the main tissue instead of ferrite was developed.

The conventional wire used to weld such structural steel has been developed to be selectively applicable to 9% Ni steel or stainless alloy or high manganese steel according to the physical properties of the structural steel in order to satisfy the strength and impact resistance value of the structure after welding. However, when the application is limited according to the material of the structural steel, confusion may occur in the work process, and there is a disadvantage in terms of economic aspects. Accordingly, there is a need to develop a welding material that can be welded without restrictions according to the materials of structural steel members and which provides excellent cryogenic toughness to the welded part.

SUMMARY

To solve the problems described above, the objective of the present invention is to provide a stainless-steel welding wire for use in manufacture of an LNG tank, the welding wire having suitable physical properties required for an LNG tank.

In order to accomplish the above objective, the present invention provides a stainless-steel welding wire having a composition including:

6.0 to 15.0 wt % of Ni, 13.0 to 25.0 wt % of Cr, 1.0 to 10.0 wt % of Mn, 5.0 wt % or less (except for 0 wt %) of Mo, and 0.05 to 1.0 wt % of Si, in which the content of C is 0.5 wt % or less (except for 0 wt %), the total content of P and S is limited to 0.1 wt % or less (except for 0 wt %), the balance includes Fe and unavoidable impurities, and the stainless-steel welding wire for use in manufacture of an LNG tank satisfies the following [Relational Expression 1]:

$\{Cr+Mo\}/\{Ni+Mn+30(C+N)\}>1$  [Relational Expression 1]

In addition, there is provided a stainless-steel welding wire having a composition including:

6.0 to 15.0 wt % of Ni, 13.0 to 25.0 wt % of Cr, 1.0 to 10.0 wt % of Mn, and 0.05 to 1.0 wt % of Si, in which the content of C is 0.5 wt % or less (except for 0 wt %), the total content of P and S is limited to 0.1 wt % or less (except for 0 wt %), at least one element (Q) selected from the group consisting of Mo, W, and Nb is contained in an amount of 0.1 to 5.0 wt %, the balance includes Fe and unavoidable impurities, and the stainless-steel welding wire for use in manufacture of an LNG tank satisfies the following [Relational Expression 2]:

$\{Cr+Q\}/\{Ni+Mn+30(C+N)\}>1$  [Relational Expression 2]

In addition, there is provided a stainless-steel welding wire from which a deposited metal is obtained, the deposited metal including 8.0 to 14.0 wt % of Ni, 15.0 to 23.0 wt % of Cr, 1.0 to 8.0 wt % of Mn, 4.0 wt % or less (except for 0 wt %) of Mo, and 0.05 to 1.0 wt % of Si, in which the total content of C and N is limited to 0.01 to 0.2 wt %, the total content of P and S is limited to 0.1 wt % or less (except for 0 wt %), the balance includes Fe and unavoidable impurities, and the stainless-steel welding wire for use in manufacture of an LNG tank satisfies the following [Relational Expression 1]:

$\{Cr+Mo\}/\{Ni+Mn+30(C+N)\}>1$  [Relational Expression 1]

In addition, there is provided a stainless-steel welding wire from which a deposited metal is obtained, the deposited metal including 8.0 to 14.0 wt % of Ni, 15.0 to 23.0 wt % of Cr, 1.0 to 8.0 wt % of Mn, and 0.05 to 1.0 wt % of Si, in which the total content of C and N is limited to 0.01 to 0.2 wt %, the total content of P and S is limited to 0.1 wt % or less (except for 0 wt %), at least one element (Q) selected from the group consisting of Mo, W, and Nb is contained in an amount of 0.1 to 4.0 wt %, the balance is Fe and unavoidable impurities, and the stainless-steel welding wire for use in manufacture of an LNG tank satisfies the following [Relational Expression 2]:

$\{Cr+Q\}/\{Ni+Mn+30(C+N)\}>1$  [Relational Expression 2]

The stainless-steel welding wire for used in manufacture of an LNG tank, according to the present disclosure, can be used for welding of 9% nickel steel members, high manganese steel members, and stainless-steel members by controlling the content relationship of Mo and Cr. The stainless-steel welding wire has the effect of obtaining a weld metal with excellent cryogenic toughness in a welding zone.

DETAILED DESCRIPTION

Hereinafter, the present invention will be described in detail.

In the present description, the term "weld metal" refers to a metal produced as a result of solidification of a molten mixture of a deposited metal and a base metal during welding.

In the present description, the term "deposited metal" refers to a metal transferred from a filler metal (i.e., wire), which is a metal material added during welding, to a weld metal zone.

According to one aspect of the present invention, there is provided a stainless-steel welding wire for use in manufacture of an LNG tank, the welding wire having a composition including predetermined weight percentages of Mn, Mo, Cr, and Ni with respect to the total weight thereof.

Specifically, the composition of the welding wire includes 6.0 to 15.0 wt % of Ni, 13.0 to 25.0 wt % of Cr, 1.0 to 10.0 wt % of Mn, 5.0 wt % or less (except for 0 wt %) of Mo, and 0.05 to 1.0 wt % of Si, in which the content of C is 0.5 wt % or less (except for 0 wt %), the total content of P and S is limited to 0.1 wt % or less (except for 0 wt %), the balance includes Fe and unavoidable impurities, and the stainless steel welding wire for use in manufacture an LNG tank satisfies [Relational Expression 1]. [Relational Expression 1] is $\{Cr+Mo\}/\{Ni+Mn+30(C+N)\}>1$ Ni: 6.0 to 15.0 wt %

Nickel (Ni) is a component that stabilizes the austenite structure. When the content of nickel is less than 6.0 wt %, it is undesirable because the austenite structure is unstable. When the content of nickel exceeds 15.0 wt %, it is undesirable because high-temperature cracking resistance deteriorates. Therefore, the content of Ni is preferably limited to the range of 6.0 to 15.0 wt %.

Cr: 13.0~25.0 wt %

Chromium (Cr) is a component that improves the strength of a weld metal and stabilizes the austenite structure. When the content of chrome is less than 13.0 wt %, it is not preferable because sufficient strength cannot be obtained. When the content of chrome exceeds 25.0 wt %, it is not preferable because the low-temperature impact toughness of a weld metal deteriorates. Therefore, the content of Cr is preferably limited to the range of 13.0 to 25.0 wt %.

Mn: 1.0~10.0 wt %

Manganese (Mn) is a component that stabilizes the austenite structure and improves the deoxidation action and weldability. When the content of Mn is less than 1.0 wt %, it is not preferable because a sufficient deoxidation effect is not obtained. When the content of Mn exceeds 10.0 wt %, the segregation of the weld metal accelerates in the final solidification region, thereby lowering the melting point of the melt and deteriorating the high-temperature cracking resistance. Therefore, the content of Mn is preferably limited to the range of 1.0 to 10.0 wt %.

Mo: 5.0 wt % or less (except for 0 wt %)

Molybdenum (Mo) has an effect of improving the strength of the weld metal. When the Mo content is small, it is not preferable because sufficient strength is not obtained. When the Mo content exceeds 5.0 wt %, it is not preferable because the toughness of the weld metal is deteriorated, and the segregation of Mo is accelerated, resulting in deterioration of in high temperature cracking resistance. Therefore, the content of Mo is preferably limited to the range of 5.0 wt % or less.

Si: 0.05~1.0 wt %

Silicon (Si) is a component that improves the deoxidation action and weldability. When the content of Si is less than 0.05 wt %, the deoxidation effect is insufficient. When the content Si exceeds 1.0 wt %, it is not desirable because the crack susceptibility increases according to the generation of the Laves phase. Therefore, the content of Si is preferably limited to 0.05 to 1.0 wt %.

C: 0.5 wt % or less (except for 0 wt %)

Carbon (C) has an effect of improving the strength of the weld metal, but there is a problem in that when it is added excessively, carbide is formed, and toughness is lowered. Therefore, the content of C is set to 0.5% or less based on the total weight of the wire. More preferably, the content of C may be set to 0.1 wt % or less to prevent deterioration of the toughness of the weld metal.

P+S: 0.1 wt % or less (except for 0 wt %)

Phosphorus (P) and sulfur (S) are elements that mainly affect high-temperature cracking. P and S may form compounds with low melting points, thereby causing high-temperature cracking. In the case of the present invention, the total content of P and S is preferably less than 0.1 wt %.

The balance may be Fe and unavoidable impurities. In addition, copper (Cu) may be further included in an amount of 0.5 wt % or less (except for 0 wt %). Copper (Cu) is a precipitation hardening element, and the content of Cu is preferably limited to 0.5 wt % or less. The content of Cu exceeding 0.5 wt %, is not preferable because hardenability increases, and thus low-temperature impact toughness is reduced. Nitrogen (N) may be further included in an amount of 0.2 wt % or less. N is a solid solution strengthening element, and it is preferable to limit the content of N to 0.2 wt % or less. When the content of N exceeds 0.4 wt %, low-temperature impact toughness deteriorates, and a full austenite structure occurs, which is not preferable because high-temperature cracking resistance and porosity resistance deteriorate.

In the welding wire of the present invention, the relationship among the contents of Mn, Cr, and Mo is adjusted to obtain the physical properties required for a weld zone. The control is preferably performed such that the value defined by Relational Expression 1 exceeds 1. When the value is 1 or less, it is difficult to secure strength and cryogenic toughness (i.e., an impact-related value), resulting in deterioration in the quality of the weld metal zone.

In addition, the present invention provides a stainless-steel welding wire for use in manufacture of an LNG tank, the welding wire having a composition including 8.0 to 15.0 wt % of Ni, 13.0 to 25.0 wt % of Cr, 1.0 to 10.0 wt % of Mn, and 0.05 to 1.0 wt % of Si, in which the content of C is 0.5 wt % or less (except for 0 wt %), the total content of P and S is limited to the range of 0.1 wt % or less (except for 0 wt %), at least element (Q) selected from the group consisting of Mo, W, and Nb is included in an amount of 0.1 to 5.0 wt %, the balance is Fe and unavoidable impurities, and the welding wire satisfies [Relational Expression 2]. [Relational Expression 2] is $\{Cr+Q\}/\{Ni+Mn+30(C+N)\}>1$ Specifically the content range of each component of the composition is as described above.

Mo, W, and Nb have an effect of improving the strength of the weld metal, and at least one of them may be selectively included. When the content of at least one element selected from the group consisting of Mo, W, and Nb is less than 0.1 wt %, sufficient strength is not obtained, which is not preferable. When the content of at least one element selected from the group consisting of Mo, W, and Nb exceeds 5.0 wt %, the toughness of the weld metal deteriorates, and high temperature cracking resistance deteriorates, which is undesirable. Therefore, the content thereof is preferably limited to 0.1 to 5.0 wt %. In Relational Expression 2, Q may be any one of Mo, [Mo+W], [Mo+Nb], [Mo+W+Nb], W, Nb, and [W+Nb]. More preferably, Relational Expression 2 may be 1.5>{Cr+Q}/{Ni+Mn+30(C+N)}>1. When the value of Relational Expression 2 is 1.5 or greater or is 1 or less or less, it is difficult to secure strength and cryogenic toughness (i.e., an impact-related value), resulting in deterioration in the quality of the weld metal zone.

Specifically, the stainless-steel welding wire of the present invention may additionally include W in an amount of 2.0 wt % or less, or may include W as a substitute of Mo. Tungsten (W) has the same effect as Mo. That is, W and Mo improve the strength of the weld metal. When the content of W exceeds 2.0 wt %, the toughness of the weld metal may deteriorate. Therefore, the content of W is preferably limited to the range of 2.0 wt % or less.

In addition, the stainless-steel welding wire of the present invention may additionally include Nb in an amount of 1.5 wt % or less, or may include Nb as a substitute of Mo. Niobium (W) has the same effect as Mo. That is, Ni and Mo improve the strength of the weld metal. When the content of Nb exceeds 1.5 wt %, the toughness of the weld metal may deteriorate. Therefore, the content of Nb is preferably limited to the range of 1.5 wt % or less.

According to another aspect of the present invention, there is provided a stainless steel welding wire for use in manufacture of an LNG tank, in which a deposited metal obtained from the welding wire has a composition including 8.0 to 14.0 wt % of Ni, 15.0 to 23.0 wt % of Cr, 1.0 to 8.0 wt % of Mn, 4.0 wt % or less (except for 0 wt %) of Mo, 0.05 to 1.0 wt % of Si, in which the total content of C and N is in the range of 0.01 to 0.2 wt %, the total content of P and S is limited to the range of 0.1 wt % or less (except for 0 wt %), the balance includes Fe and unavoidable impurities, and the welding wire satisfies [Relational Expression 1]. [Relational Expression 1] is {Cr+Mo}/{Ni+Mn+30(C+N)}>1

Depending on the alloy composition of the welding wire, the properties of the obtained deposited metal vary. For example, depending on the alloy composition, it is determined whether it is possible to obtain the properties required for the manufacture of an LNG tank. With the use of the welding wire according to the present invention, it is possible to obtain a deposited metal having excellent strength, toughness, and impact value.

Nickel (Ni) is a component that stabilizes the austenite structure. When the content of nickel is less than 8.0 wt %, it is undesirable because the austenite structure is unstable. When the content of nickel exceeds 14.0 wt %, it is undesirable because high-temperature cracking resistance deteriorates. Therefore, the content of Ni is preferably limited to the range of 8.0 to 14.0 wt %.

Chromium (Cr) is a component that improves the strength of a weld metal and stabilizes the austenite structure. When the content of chrome is less than 15.0 wt %, it is not preferable because sufficient strength cannot be obtained. When the content of chrome exceeds 23.0 wt %, it is not preferable because the low-temperature impact toughness of a weld metal deteriorates. Therefore, the content of Cr is preferably limited to the range of 15.0 to 23.0 wt %.

Manganese (Mn) is a component that stabilizes the austenite structure and improves the deoxidation action and weldability. When the content of Mn is less than 1.0 wt %, it is not preferable because a sufficient deoxidation effect is not obtained. When the content of Mn exceeds 8.0 wt %, the segregation of the weld metal accelerates in the final solidification region, resulting in deterioration in the high-temperature cracking resistance. Therefore, the content of Mn is preferably limited to the range of 1.0 to 8.0 wt %.

Molybdenum (Mo) has an effect of improving the strength of the weld metal. When the Mo content is small, it is not preferable because sufficient strength is not obtained. When the Mo content exceeds 4.0 wt %, it is not preferable because the toughness of the weld metal deteriorates, and the segregation accelerates, resulting in deterioration of in high-temperature cracking resistance. Therefore, the content of Mo is preferably limited to the range of 4.0 wt % or less.

When the content of Si is less than 0.05 wt %, the deoxidation effect is insufficient. When the content of Si exceeds 1.0 wt %, it is not desirable because the crack susceptibility increases according to the generation of the Laves phase. Therefore, the content of Si is preferably limited to the range of 0.05 to 1.0 wt %.

Carbon (C) has an effect of improving the strength of the weld metal, but there is a problem in that when it is added excessively, carbide is formed, and toughness is lowered. N is a solid solution strengthening element, and when it is added excessively, low-temperature impact toughness deteriorates, and a full austenite structure occurs, which is not preferable because high-temperature cracking resistance and porosity resistance deteriorate. Therefore, the total content of C and N is preferably limited to the range of 0.01 to 0.5 wt %.

Phosphorus (P) and sulfur (S) are elements that mainly affect high-temperature cracking. P and S may form compounds with low melting points, thereby causing high-temperature cracking. In the case of the present invention, the total content of P and S is preferably less than 0.1 wt %.

The balance may be Fe and unavoidable impurities. In addition, copper (Cu) may be further included in an amount of 0.5 wt % or less (except for 0 wt %). Copper (Cu) is a precipitation hardening element, and the content of Cu is preferably limited to 0.5 wt % or less. The content of Cu exceeding 0.5 wt %, is not preferable because hardenability increases, and thus low-temperature impact toughness is reduced. Nitrogen (N) may be further included in an amount of 0.2 wt % or less. N is a solid solution strengthening element, and it is preferable to limit the content of N to 0.2 wt % or less. When the content of N exceeds 0.4 wt %, low-temperature impact toughness deteriorates, and a full austenite structure occurs, which is not preferable because high-temperature cracking resistance and porosity resistance deteriorate.

On the other hand, in connection with the stainless-steel welding wire of the present invention, and the deposited metal obtained from the wire, it is preferable that the content of each component is controlled to satisfy [Relational Expression 1].

[Relational Expression 1] is {Cr+Mo}/{Ni+Mn+30(C+N)}>1. The control is preferably performed such that the value defined by Relational Expression 1 exceeds 1. When the value is 1 or less, it is difficult to secure strength and cryogenic toughness (i.e., an impact-related value), resulting in deterioration in the quality of the weld metal zone. Specifically, when {Cr+Mo}/{Ni+Mn+30(C+N)}>1 is satisfied, the deposited metal obtained from the welding wire has a yield strength of 400 MPa or more, a tensile strength of 640 MPa or more, and an elongation of 30% or more. In addition, the Charpy impact test shows that deposited metal exhibits an impact value of 27 J or more at −196° C.

In addition, the present invention provides a stainless-steel welding wire for use in manufacture of an LNG tank, in which a deposited metal obtained from the welding wire has a composition including 8.0 to 14.0 wt % of Ni, 15.0 to 23.0 wt % of Cr, 1.0 to 8.0 wt % of Mn, 0.05 to 1.0 wt % of Si, in which the total content of C and N is in the range of 0.01 to 0.2 wt %, the total content of P and S is limited to the range of 0.1 wt % or less (except for 0 wt %), at least element (Q) selected from the group consisting of Mo, W, and Nb is included in an amount of 0.1 to 4.0 wt %, the balance is Fe and unavoidable impurities, and the composition of the deposited metal satisfies [Relational Expression 2]. [Relational Expression 2] is {Cr+Q}/{Ni+Mn+30 (C+N)}>1

Specifically the content range of each component of the composition is as described above.

In the case where the composition additionally includes W or Nb or in the case where Mo is replaced with W or Nb, it is preferable that the stainless-steel welding wire of the present invention or the deposited metal obtained from the welding wire satisfies Relational Expression 2 given below. In Relational Expression 2, Q may be any one of Mo, [Mo+W], [Mo+Nb], [Mo+W+Nb], W, Nb, and [W+Nb]. More preferably, Relational Expression 2 may be 1.5>{Cr+Q}/{Ni+Mn+30(C+N)}>1. When the value of Relational Expression 2 is 1.5 or greater or is 1 or less or less, it is difficult to secure strength and cryogenic toughness (i.e., an impact-related value), resulting in deterioration in the quality of the weld metal zone.

In the stainless-steel welding wire according to the present invention, the stainless-steel welding wire may be applied to any one of flux cored arc welding (FCAW), submerged arc welding (SAW), gas metal arc welding (GMAW), gas tungsten arc welding (GTAW), inert gas metal arc welding (MIG), and inert gas tungsten arc welding (TIG). Applications of the welding wire may not be limited by the welding method. Preferably, the welding wire of the present invention may be applied to submerged arc welding (SAW).

In connection with the stainless-steel welding wire according to the present invention, the physical properties of the weld metal zone according to the relationship between the contents of Cr, Mo, and Mn will be described in detail with reference to Examples and Comparative Examples described below, but the scope of the present invention is not limited by the examples.

A stainless steel welding wire for submerged arc welding (SAW), having a composition shown in Table 1, was prepared.

TABLE 1

|   | Ni | Cr | Mn | Mo | Cu | Si | C | N | P + S | W | Nb | Expression 1 |
|---|---|---|---|---|---|---|---|---|---|---|---|---|
| 1 | 8.61 | 16.47 | 5.69 | 1.95 | 0 | 0.43 | 0.015 | 0 | 0.03 | 0 | 0 | 1.34 |
| 2 | 8.60 | 16.57 | 8.14 | 1.93 | 0 | 0.41 | 0.015 | 0 | 0.03 | 0 | 0 | 1.14 |
| 3 | 8.95 | 16.07 | 6.75 | 1.25 | 0 | 0.50 | 0.015 | 0 | 0.03 | 0 | 0 | 1.14 |
| 4 | 8.04 | 16.14 | 6.79 | 1.05 | 0 | 0.49 | 0.015 | 0 | 0.03 | 0 | 0 | 1.13 |
| 5 | 8.61 | 16.47 | 5.69 | 1.73 | 0 | 0.53 | 0.015 | 0 | 0.03 | 0.57 | 0 | 1.32 |
| 6 | 8.72 | 16.24 | 6.07 | 0 | 0 | 0.49 | 0.015 | 0 | 0.03 | 1.95 | 0 | 1.14 |
| 7 | 8.93 | 20.43 | 3.71 | 2.69 | 0 | 0.41 | 0.015 | 0 | 0.03 | 0 | 0.59 | 1.77 |
| 8 | 7.88 | 16.02 | 5.76 | 0 | 0 | 0.55 | 0.015 | 0 | 0.03 | 0 | 1.07 | 1.14 |
| 9 | 9.17 | 19.93 | 4.63 | 3.03 | 0 | 0.49 | 0.015 | 0 | 0.03 | 0.39 | 0.27 | 1.61 |
| 10 | 8.62 | 15.93 | 6.23 | 0 | 0 | 0.46 | 0.015 | 0 | 0.04 | 1.37 | 0.54 | 1.04 |
| 11 | 7.49 | 17.18 | 5.19 | 1.41 | 0 | 0.48 | 0.015 | 0 | 0.03 | 0 | 0 | 1.42 |
| 12 | 7.29 | 11.68 | 6.67 | 1.25 | 0 | 0.39 | 0.015 | 0 | 0.04 | 0 | 0 | 0.90 |
| 13 | 9.61 | 16.17 | 6.19 | 7.00 | 0 | 0.50 | 0.015 | 0 | 0.04 | 0 | 0 | 1.43 |
| 14 | 15.37 | 15.97 | 6.93 | 1.25 | 0 | 0.49 | 0.015 | 0 | 0.03 | 0 | 0 | 0.76 |
| 15 | 9.61 | 16.19 | 6.94 | 1.25 | 0 | 0.47 | 0.015 | 0.26 | 0.03 | 0 | 0 | 0.70 |
| 16 | 6.17 | 18.19 | 5.95 | 3.91 | 0 | 0.44 | 0.015 | 0 | 0.03 | 0 | 0 | 1.76 |
| 17 | 7.94 | 16.21 | 9.08 | 1.13 | 0 | 0.55 | 0.015 | 0 | 0.04 | 0 | 0 | 0.99 |
| 18 | 7.67 | 16.00 | 10.75 | 5.17 | 0 | 0.49 | 0.015 | 0 | 0.04 | 0 | 0 | 1.12 |
| 19 | 7.11 | 12.19 | 6.75 | 6.64 | 0 | 0.50 | 0.015 | 0 | 0.03 | 0 | 0 | 1.32 |
| 20 | 7.86 | 25.73 | 10.61 | 1.25 | 0 | 0.43 | 0.015 | 0 | 0.03 | 0 | 0 | 1.43 |
| 21 | 7.56 | 16.41 | 5.53 | 1.89 | 0 | 0.43 | 0.015 | 0 | 0.03 | 2.91 | 0 | 1.35 |
| 22 | 7.66 | 16.57 | 5.58 | 0 | 0 | 0.53 | 0.015 | 0 | 0.03 | 2.23 | 0 | 1.21 |
| 23 | 759 | 16.51 | 5.67 | 1.94 | 0 | 0.53 | 0.015 | 0 | 0.03 | 0 | 1.67 | 1.35 |
| 24 | 7.69 | 16.69 | 5.71 | 0 | 0 | 0.53 | 0.015 | 0 | 0.03 | 0 | 1.93 | 1.21 |
| 25 | 9.19 | 16.92 | 10.18 | 1.37 | 0 | 0.39 | 0.015 | 0 | 0.03 | 2.19 | 0 | 0.92 |
| 26 | 7.59 | 16.37 | 10.09 | 0 | 0 | 0.40 | 0.015 | 0 | 0.03 | 2.86 | 0 | 0.90 |
| 27 | 7.64 | 16.97 | 10.91 | 1.94 | 0 | 0.51 | 0.015 | 0 | 0.02 | 0 | 1.56 | 1.00 |
| 28 | 9.51 | 17.54 | 10.05 | 0 | 0 | 0.51 | 0.015 | 0 | 0.03 | 0 | 1.97 | 0.88 |

Specifically, the deposited metal obtained from the stainless-steel welding wire of the present invention through welding may include W in an amount of 2.0 wt % or less instead of Mo. Tungsten (W) has the same effect as Mo. That is, W and Mo improve the strength of the weld metal. When the content of W exceeds 2.0 wt %, the toughness of the weld metal may deteriorate. Therefore, the content of W is preferably limited Specifically, the deposited metal obtained from the stainless-steel welding wire of the present invention through welding may additionally include Nb in an amount of 1.5 wt % or may include Nb as a substitute of Mo. Niobium (W) has the same effect as Mo. That is, Ni and Mo improve the strength of the weld metal. When the content of Nb exceeds 1.5 wt %, the toughness of the weld metal may deteriorate. Therefore, the content of Nb is preferably limited to the range of 1.5 wt % or less.

Submerged arc welding (SAW) was performed with each welding material. In the case of SAW, welding was performed with a heat input of 10.0 to 18.0 KJ/cm. A wire having a diameter of 2.4 mm was used for the SAW. A bevel was formed such that a bevel angle of a 9% Ni steel plate with a plate thickness of 20 mm, which is one of the base materials for manufacturing an LNG tank, with respect to a bevel face became 30°. After that, the base metals were arranged so that the root gap was 3 mm, and a weld joint was formed by performing single pass welding, using the same type of FCAW welding material, on a narrow portion (root portion) of a groove to form a weld joint. Visual inspection was performed for the arc stability of the weld joint, slag peelability, crack resistance of the weld joint, and bead appearance (presence or absence of pores). The inspection results were classified into four classes: ⊚ (excellent), ○ (good), Δ (poor), and X (fail). The results are shown in Table 2 below.

TABLE 2

|   | Crack resistance | Arc stability | Bead appearance | Slag peelability | Crack ratio (%) |
|---|---|---|---|---|---|
| 1 | ⊚ | ⊚ | ⊚ | ⊚ | 0 |
| 2 | ⊚ | ○ | ○ | ⊚ | 0 |
| 3 | ⊚ | ⊚ | ⊚ | ⊚ | 0 |
| 4 | ⊚ | ⊚ | ⊚ | ⊚ | 0 |
| 5 | ○ | ⊚ | ⊚ | ⊚ | 4 |
| 6 | ⊚ | ⊚ | ⊚ | ⊚ | 0 |
| 7 | ○ | ⊚ | ⊚ | ⊚ | 5 |
| 8 | ⊚ | ⊚ | ⊚ | ⊚ | 0 |
| 9 | ○ | ⊚ | ⊚ | ⊚ | 7 |
| 10 | ⊚ | ⊚ | ⊚ | ⊚ | 0 |
| 11 | ⊚ | Δ | Δ | Δ | 0 |
| 12 | Δ | ⊚ | ⊚ | ⊚ | 45 |
| 13 | ○ | ⊚ | ⊚ | ⊚ | 17 |
| 14 | Δ | ⊚ | ⊚ | ⊚ | 40 |
| 15 | ○ | ⊚ | ⊚ | ⊚ | 13 |
| 16 | ○ | ⊚ | ⊚ | ⊚ | 9 |
| 17 | ⊚ | ⊚ | ⊚ | ⊚ | 0 |
| 18 | ○ | ○ | ○ | ○ | 12 |
| 19 | ⊚ | ⊚ | ⊚ | ⊚ | 0 |
| 20 | ○ | ○ | ○ | ○ | 11 |
| 21 | ○ | ⊚ | ⊚ | ⊚ | 7 |
| 22 | ⊚ | ⊚ | ⊚ | ⊚ | 0 |
| 23 | ○ | ⊚ | ⊚ | ⊚ | 9 |
| 24 | ⊚ | ⊚ | ⊚ | ⊚ | 0 |
| 25 | ○ | ○ | ⊚ | ⊚ | 9 |
| 26 | ⊚ | ○ | ○ | ⊚ | 0 |
| 27 | ○ | ○ | ○ | ⊚ | 10 |
| 28 | ⊚ | ○ | ○ | ⊚ | 0 |

Referring to Table 2, it was confirmed that in the case of No. 11 that did not satisfy Relational Expression 1, arc stability and bead appearance were not satisfactory. In addition, it was confirmed that in the case of Nos. 12, 14, and 16 that did not satisfy Relational Expression 2, the crack ratio was high. In the case of Nos. 20 and 27, it was confirmed that cracks were generated depending on the content of Mn. Next, the yield strength (YS), tensile strength (TS), elongation (EL), and Charpy impact energy (at −196° C.) of the weld joint were measured. The obtained results are shown in Table 3 below.

TABLE 3

|   | YS (MPa) | TS (MPa) | Elongation (%) | CVM Impact (J@-196° C.) |
|---|---|---|---|---|
| 1 | 452 | 707 | 40 | 39 |
| 2 | 426 | 701 | 39 | 38 |
| 3 | 435 | 651 | 40 | 45 |
| 4 | 427 | 647 | 40 | 44 |
| 5 | 468 | 729 | 38 | 37 |
| 6 | 451 | 697 | 38 | 37 |
| 7 | 461 | 723 | 39 | 38 |
| 8 | 439 | 689 | 39 | 38 |
| 9 | 487 | 731 | 38 | 36 |
| 10 | 437 | 702 | 39 | 37 |
| 11 | 430 | 657 | 40 | 42 |
| 12 | 370 | 530 | 43 | 45 |
| 13 | 549 | 767 | 30 | 24 |
| 14 | 364 | 614 | 41 | 44 |
| 15 | 394 | 637 | 43 | 43 |
| 16 | 504 | 727 | 37 | 29 |
| 17 | 405 | 626 | 40 | 43 |
| 18 | 461 | 694 | 31 | 23 |
| 19 | 394 | 627 | 34 | 26 |
| 20 | 483 | 741 | 29 | 22 |
| 21 | 467 | 729 | 37 | 34 |
| 22 | 449 | 703 | 39 | 37 |
| 23 | 471 | 738 | 35 | 33 |
| 24 | 457 | 699 | 40 | 38 |
| 25 | 461 | 709 | 34 | 27 |
| 26 | 428 | 667 | 36 | 31 |
| 27 | 459 | 710 | 35 | 29 |
| 28 | 419 | 671 | 36 | 32 |

Referring to Table 3, it was confirmed that the yield strength, tensile strength, and especially the impact value were low in the case of Nos. 12 to 20 which did not satisfy Relational Expression 1. On the other hand, in the case of Nos. 1 to 10 prepared to satisfy the composition range of the present invention, it was possible to secure a yield strength of 400 MPa or more, a tensile strength of 650 MPa or more, an elongation of 38% or more, and an impact value of 35 J or more.

In addition, a stainless-steel welding wire having the components shown in Table 4 was prepared according to Relational Expression 2 related to the content of Mo, W, or Nb. The results of the evaluation of the properties of the weld joint after performing welding are shown in Table 5 below.

TABLE 4

|   | Ni | Cr | Mn | Mo | Cu | Si | C | N | P + S | W | Nb | Expression 2 |
|---|---|---|---|---|---|---|---|---|---|---|---|---|
| 5 | 8.61 | 16.47 | 5.69 | 1.73 | 0 | 0.53 | 0.015 | 0 | 0.03 | 0.57 | 0 | 1.37 |
| 6 | 8.72 | 16.24 | 6.07 | 0 | 0 | 0.49 | 0.015 | 0 | 0.03 | 1.95 | 0 | 1.28 |
| 7 | 8.93 | 20.43 | 3.71 | 2.69 | 0 | 0.41 | 0.015 | 0 | 0.03 | 0 | 0.59 | 1.35 |
| 8 | 7.88 | 16.02 | 5.76 | 0 | 0 | 0.55 | 0.015 | 0 | 0.03 | 0 | 1.07 | 1.21 |
| 9 | 9.17 | 19.93 | 4.63 | 3.03 | 0 | 0.49 | 0.015 | 0 | 0.03 | 0.39 | 0.27 | 1.33 |
| 10 | 8.62 | 15.93 | 6.23 | 0 | 0 | 0.46 | 0.015 | 0 | 0.03 | 1.37 | 0.54 | 1.25 |
| 21 | 7.56 | 16.41 | 5.53 | 1.89 | 0 | 0.43 | 0.015 | 0 | 0.03 | 2.91 | 0 | 1.57 |
| 22 | 7.66 | 16.57 | 5.58 | 0 | 0 | 0.53 | 0.015 | 0 | 0.03 | 2.23 | 0 | 1.37 |
| 23 | 7.59 | 16.51 | 5.67 | 1.94 | 0 | 0.53 | 0.015 | 0 | 0.03 | 0 | 1.67 | 1.47 |
| 24 | 7.69 | 16.69 | 5.71 | 0 | 0 | 0.53 | 0.015 | 0 | 0.03 | 0 | 1.93 | 1.34 |
| 25 | 9.19 | 16.92 | 10.18 | 1.37 | 0 | 0.39 | 0.015 | 0 | 0.03 | 2.19 | 0 | 0.98 |
| 26 | 7.59 | 16.37 | 10.09 | 0 | 0 | 0.40 | 0.015 | 0 | 0.03 | 2.86 | 0 | 1.06 |
| 27 | 7.64 | 16.97 | 10.91 | 1.94 | 0 | 0.51 | 0.015 | 0 | 0.03 | 0 | 1.56 | 1.08 |
| 28 | 9.51 | 17.54 | 10.05 | 0 | 0 | 0.51 | 0.015 | 0 | 0.03 | 0 | 1.97 | 0.98 |
| 29 | 9.95 | 15.57 | 7.63 | 0 | 0 | 0.51 | 0.015 | 0 | 0.03 | 0.15 | 0 | 0.98 |
| 30 | 7.59 | 15.95 | 6.05 | 5.07 | 0 | 0.43 | 0.015 | 0 | 0.03 | 2.13 | 0 | 1.64 |
| 31 | 7.95 | 16.17 | 5.89 | 5.14 | 0 | 0.51 | 0.015 | 0 | 0.03 | 0 | 1.67 | 1.61 |
| 32 | 9.62 | 15.81 | 5.91 | 5.08 | 0 | 0.51 | 0.015 | 0 | 0.03 | 2.07 | 1.59 | 1.54 |
| 33 | 9.73 | 21.07 | 3.95 | 3.02 | 0 | 0.39 | 0.015 | 0 | 0.03 | 2.19 | 0 | 1.70 |
| 34 | 7.57 | 17.21 | 5.94 | 1.97 | 0 | 0.46 | 0.015 | 0 | 0.03 | 0 | 1.83 | 1.51 |
| 35 | 9.97 | 16.07 | 9.84 | 0 | 0 | 0.53 | 0.015 | 0 | 0.03 | 2.23 | 1.74 | 0.99 |

TABLE 5

| | Expression 2 | YS (MPa) | TS (MPa) | Elongation (%) | CVM Impact (J@-196° C.) |
|---|---|---|---|---|---|
| 5 | 1.37 | 468 | 729 | 38 | 37 |
| 6 | 1.28 | 451 | 697 | 38 | 37 |
| 7 | 1.35 | 461 | 723 | 39 | 43 |
| 8 | 1.21 | 439 | 689 | 39 | 38 |
| 9 | 1.33 | 487 | 731 | 38 | 45 |
| 10 | 1.25 | 437 | 702 | 39 | 37 |
| 21 | 1.57 | 467 | 729 | 37 | 34 |
| 22 | 1.37 | 449 | 703 | 39 | 37 |
| 23 | 1.47 | 471 | 738 | 35 | 33 |
| 24 | 1.34 | 457 | 699 | 40 | 38 |
| 25 | 1.19 | 461 | 709 | 34 | 27 |
| 26 | 1.06 | 428 | 667 | 36 | 31 |
| 27 | 1.08 | 459 | 710 | 35 | 29 |
| 28 | 0.98 | 419 | 671 | 36 | 23 |
| 29 | 1.51 | 479 | 747 | 32 | 24 |
| 30 | 1.64 | 484 | 759 | 30 | 25 |
| 31 | 1.61 | 481 | 755 | 31 | 26 |
| 32 | 1.54 | 493 | 763 | 29 | 22 |
| 33 | 1.70 | 461 | 721 | 36 | 42 |
| 34 | 1.51 | 457 | 741 | 34 | 31 |
| 35 | 1.69 | 462 | 732 | 34 | 26 |

Referring to Tables 4 and 5, it was confirmed that when the W or Nb which was added additionally or added for substitution of Mn, when the value of the relationship between Mn and either W or Nb was in the range of 25 to 28 that were outside the composition range of the present invention, the low impact value was low. In addition, in the case of the value in the range 29 to 35 that did not satisfy Relational Expression 2, it was confirmed that the impact value was also low. Therefore, it is confirmed that when adding W and Nb as an additional component or as a substitute of Mo, it is preferable that the content ratio is adjusted according to Relational Expression 2.

The stainless-steel welding wire according to the present invention is characterized in that it is possible to obtain a weld metal having excellent strength and cryogenic impact toughness from the stainless-steel welding wire because the contents of Mo and Cr are suitably controlled while limiting the content of manganese to the range of 10 wt % or less. The stainless-steel welding wire according to the present invention can be applicable to welding of 9% nickel steel, high manganese steel, and stainless steel, and has an advantageous effect of obtain a weld metal having excellent cryogenic toughness in the weld zone.

The foregoing has broadly described the features and technical advantages of the present invention so that the appended claims can be better understood. The ordinarily skilled people in this art will appreciate that the present invention can be implemented in other different forms without departing from the technical spirit or essential characteristics of the exemplary embodiments. Therefore, it can be understood that the examples described above are only for illustrative purposes and are not restrictive in all aspects. The scope of the present invention is defined by the following claims rather than the above detailed description, and all changes or modifications derived from the meaning and scope of the claims and their equivalent concepts should be interpreted as falling into the scope of the present invention.

What is claimed:

1. A stainless-steel welding wire for manufacturing an LNG tank, the welding wire having a composition comprising 8.04 to 9.61 wt % of Ni, 13.0 to 25.0 wt % of Cr, 3.71 to 10.0 wt % of Mn, Mo present with W or with W and Nb in an amount of 5.0 wt % or less, and 0.05 to 0.55 wt % of Si, wherein:
C is present in an amount of 0.5 wt % or less,
P and S are present, and the total content of P and S is limited to 0.1 wt % or less,
the balance includes Fe and unavoidable impurities, and
the welding wire satisfies the following: $\{Cr+Mo\}/\{Ni+Mn+30(C+N)\}>1$.

2. A stainless-steel welding wire for manufacturing an LNG tank, the welding wire having a composition comprising 8.04 to 9.61 wt % of Ni, 13.0 to 25.0 wt % of Cr, 1.0 to 10.0 wt % of Mn, and 0.05 to 0.55 wt % of Si, wherein C is present in an amount of 0.5 wt % or less,
P and S are present, and the total content of P and S is limited to the range of 0.1 wt % or less,
two or more elements (Q) consisting of Mo and W, or Mo, W, and Nb, wherein Q is included in an amount of 0.1 to 5.0 wt %,
the balance is Fe and unavoidable impurities, and
the welding wire satisfies the following: $1.5>\{Cr+Q\}/\{Ni+Mn+30(C+N)\}>1$.

3. The stainless-steel welding wire of claim 1, wherein the welding wire provides a deposited metal having a composition comprising Ni, 15.0 to 23.0 wt % of Cr, 3.71 to 8.0 wt % of Mn, Mo present in an amount of 4.0 wt % or less, and Si, wherein the total content of C and N is in the range of 0.01 to 0.2 wt %,
P and S are present, and the total content of P and S is limited to the range of 0.1 wt % or less,
the balance includes Fe and unavoidable impurities, and
the deposited metal satisfies the following: $\{Cr+Mo\}/\{Ni+Mn+30(C+N)\}>1$.

4. The stainless-steel welding wire of claim 2, wherein the welding wire provides a deposited metal having a composition comprising Ni, 15.0 to 23.0 wt % of Cr, 1.0 to 8.0 wt % of Mn, and Si, wherein the total content of C and N is in the range of 0.01 to 0.2 wt %,
P and S are present, and the total content of P and S is limited to the range of 0.1 wt % or less,
at least one element (Q) selected from the group consisting of Mo, W, and Nb is included in an amount of 0.1 to 4.0 wt %,
the balance is Fe and unavoidable impurities, and
the deposited metal satisfies the following: $\{Cr+Q\}/\{Ni+Mn+30(C+N)\}>1$.

5. A welding process comprising welding using the welding wire of claim 1, wherein the welding process comprises one of flux cored arc welding (FCAW), submerged arc welding (SAW), gas metal arc welding (GMAW), gas tungsten arc welding (GTAW), inert gas metal arc welding (MIG), and inert gas tungsten arc welding (TIG).

6. A welding process comprising welding using the welding wire of claim 2, wherein the welding process comprises one of flux cored arc welding (FCAW), submerged arc welding (SAW), gas metal arc welding (GMAW), gas tungsten arc welding (GTAW), inert gas metal arc welding (MIG), and inert gas tungsten arc welding (TIG).

7. A welding process comprising welding using the welding wire of claim 3, wherein the welding process comprises one of flux cored arc welding (FCAW), submerged arc welding (SAW), gas metal arc welding (GMAW), gas tungsten arc welding (GTAW), inert gas metal arc welding (MIG), and inert gas tungsten arc welding (TIG).

8. A welding process comprising welding using the welding wire of claim 4, wherein the welding process comprises one of flux cored arc welding (FCAW), submerged arc welding (SAW), gas metal arc welding (GMAW), gas tungsten arc welding (GTAW), inert gas metal arc welding (MIG), and inert gas tungsten arc welding (TIG).

* * * * *

UNITED STATES PATENT AND TRADEMARK OFFICE
CERTIFICATE OF CORRECTION

PATENT NO. : 12,325,091 B2  
APPLICATION NO. : 17/752932  
DATED : June 10, 2025  
INVENTOR(S) : Hee Dae Im et al.

Page 1 of 1

It is certified that error appears in the above-identified patent and that said Letters Patent is hereby corrected as shown below:

In the Specification

In the Detailed Description

Column 7, Line 57-58, please replace "Therefore, the content of W is preferably limited" with --Therefore, the content of W is preferably limited to the range of 2.0 wt% or less.--

Signed and Sealed this  
Ninth Day of September, 2025

Coke Morgan Stewart  
*Acting Director of the United States Patent and Trademark Office*